United States Patent [19]

Gneuss

[11] Patent Number: 5,090,887
[45] Date of Patent: Feb. 25, 1992

[54] SIEVE ARRANGEMENT FOR CLEANING SYNTHETIC PLASTIC MELTS

[75] Inventor: Detlef Gneuss, Bad Oeynhausen, Fed. Rep. of Germany

[73] Assignee: Gneuss Kunststofftechnik GmbH, Bad Oeynhausen, Fed. Rep. of Germany

[21] Appl. No.: 469,954

[22] Filed: Jan. 25, 1990

[30] Foreign Application Priority Data

Jan. 25, 1989 [DE] Fed. Rep. of Germany ....... 3902061

[51] Int. Cl.⁵ ............................................. B29C 47/68
[52] U.S. Cl. .................................... 425/185; 210/108; 210/333.1; 425/199; 425/225
[58] Field of Search .................. 264/39, 169; 210/108, 210/333.01, 333.1, 411, 412; 425/197, 198, 199, 185, 225

[56] References Cited

U.S. PATENT DOCUMENTS

| | | | |
|---|---|---|---|
| 2,507,591 | 5/1950 | Cox | 425/199 |
| 4,151,086 | 4/1979 | Brooks | 210/142 |
| 4,174,198 | 11/1979 | Kinoshita | 425/197 |
| 4,257,901 | 3/1981 | Rapp | 425/197 |
| 4,271,018 | 6/1981 | Drori | 210/108 |
| 4,332,541 | 6/1982 | Anders | 425/197 |
| 4,486,304 | 12/1984 | Neuman et al. | 425/197 |
| 4,619,600 | 10/1986 | Gneuss | 425/197 |
| 4,752,386 | 6/1988 | Schulz et al. | 425/199 |
| 4,755,290 | 7/1988 | Neuman et al. | 425/199 |

FOREIGN PATENT DOCUMENTS

| | | | |
|---|---|---|---|
| 270501 | 6/1988 | European Pat. Off. | 210/108 |
| 50-3346 | 2/1975 | Japan | 425/199 |
| 50-35945 | 11/1975 | Japan | 425/199 |
| 593786 | 3/1976 | Switzerland | 425/199 |

*Primary Examiner*—Jay H. Woo
*Assistant Examiner*—Robert B. Davis
*Attorney, Agent, or Firm*—Michael J. Striker

[57] ABSTRACT

A sieve arrangement for cleaning synthetic plastic melts of a high pressure press has a housing having a through-flow opening which is arranged to form a part of a flow passage of a high pressure press, a disc provided with a plurality of perforations and movable in the housing so that at least one of the perforations is always in the region of the throughflow opening and at least one of the perforations is always outside the housing, a plurality of sieve discs arranged inside the perforations, a blockable spraying passage provided at the side of the throughflow opening which is located behind the disc as considered in a flow direction, a slot-shaped spraying nozzle associated with the perforation located away outside the throughflow opening and inside the housing so that the spraying passage opens into the spraying nozzle, an outlet passage provided in the housing at a side of the disc which is opposite to the spraying nozzle. The spraying passage or the opposite passage are provided with a blocking device which is synchronized with a drive of the disc, the spraying nozzle has a slot width which substantially corresponds to a value of a displacement cycle of the sieve discs.

10 Claims, 4 Drawing Sheets

SIEVE ARRANGEMENT FOR CLEANING SYNTHETIC PLASTIC MELTS

BACKGROUND OF THE INVENTION

The present invention relates to a sieve arrangement for cleaning synthetic plastic melts at a high pressure press. More particularly, it relates to a sieve arrangement of the above mentioned type, which has a housing with a throughflow opening forming a part of a flow passage of the high pressure press and a plate or disc provided with several perforations and cyclically displaceable or rotatable in a housing by a drive. At least one of the perforations lies always in the region of the throughflow opening and at least one of the perforations lies always outside the housing, and sieve discs are arranged inside the perforations.

Sieve arrangement of this type are known in the art. One of such sieve arrangements is disclosed in the German document DE-PS 3,443,654. The sieve arrangement described in this document has a rotatable disc located inside the housing and provided with sieve discs in its perforations. Another German document DE-AS 2,153,962 discloses a sieve arrangement in which a displacement plate is arranged in the housing and has perforations provided with sieve discs. The principle advantage of a sieve arrangement is that it allows a continuous exchange of the efficiency of discs and an exchange of strongly dirtied sieve discs. The latter mentioned exchange is performed in that at least one of the perforations and thereby the associated sieve disc is located always outside of the housing and thereby it is freely accessible for an exchange.

In the sieve arrangement disclosed in the German document DE-PS 3,443,654, in the event of dirtying of the sieve disc located in the melt passage and thereby resulting pressure increase in the melt passage, the plate or disc provided with several perforations and the sieve discs in them is somewhat displaced or turned. Thereby a part of the dirtied sieve discs is moved out of the melt passage and a new clean part of a sieve disc can be moved to the region of the melt passage. Thereby a greater, non-dirtied sieve disc portion inside the melt passage is provided and the pressure condition can be normalized. As long as with increasing dirtying again an increase of the melt pressure is detected, a further movement of the plate or disc with the above mentioned effect is performed. This means that the constant maintenance of the pressure in the melt passage can be activated by progressive insertion of non-dirtied sieve disc regions into the melt passage. Those sieve discs which have passed the melt passage are correspondingly dirtied. Basically this dirtied sieve or sieve disc can be exchanged completely and replaced by new or clean sieve or sieve discs.

SUMMARY OF THE INVENTION

Accordingly, it is an object of the present invention to provide a sieve arrangement which is a further improvement of sieve arrangements of the above mentioned general type.

More particularly it is an object of the present invention to provide such a sieve arrangement of the above type in which the time of utilization of the sieve or sieve discs can be further increased, or in other words, the intervals required for exchanging the sieves located outside of the melt passage can be significantly increased by a continuous cleaning of the sieve discs in counterspraying process by the synthetic plastic melt.

In keeping with these objects and with others which will become apparent hereinafter, one feature of the present invention resides, briefly stated, in a sieve arrangement characterized by the following features:

a) a blockable spraying passage is provided inside the housing at the side of the throughflow opening lying behind the plate or disc as considered in the flow direction, and a slot-shaped spraying nozzle opens in a throughflow region of a perforation which always lies outside the throughflow opening and completely inside the housing;

b) an outlet passage is provided in the housing at the side of the plate which is opposite to the spraying nozzle;

c) The spraying passage or the outlet passage is provided with a blocking device which is synchronized with the drive of the plate or disc.

d) The slot width of the spraying mozzle corresponds substantially to the value of the displacement cycle of the sieve discs.

When the sieve arrangement is designed in accordance with the present invention it allows the continuous cleaning of the sieve discs with the use of the counterspraying process. It is advantageous that the cleaning process practically has no influence on the production process. The filtering of the melt in the melt passage, the cleaning of the sieve discs in the counterspraying process, and the withdrawal of the sieve discs for the exchange are performed at different locations of the whole arrangment, so that these steps do not affect one another. The release or the blocking of the spraying passage is synchronized with the drive of the plate or the disc. The synchronization in the present invention means that the number of the cleaning steps corresponds to the number of the movements of the plate or disc. The release of the spraying nozzle can be performed with a time offset relative to the drive process of the disc or the plate. The duration of the release of the spraying nozzle can be timely equalized with the switching-on time of the drive of the plate or the disc, and also can be determined detached from the switching-on duration of the respective drive.

As a result, a smaller region of the sieve disc to be cleaned is actually cleaned and therefore a shorter opening of the spraying passage is required. The reason is that the plate or the disc is displaced or turned in relatively short steps, depending on the dirtying condition of the sieve disc lying within the throughflow opening. With increasing degree of dirtying and thereby produced pressure increase, the switching pulses are provided for further transportation of the plate or the disc, until the desired pressure conditions have been adjusted. During this phase the spraying passage is released and corresponding portion of the sieve disc is cleaned.

In the inventive sieve arrangement an opening of the spraying nozzle takes place for a short time per each cleaning cycle. A short melt flow pulse which act on a small gap of the sieve disc serves for extremely good sieve cleaning in that a high pressure difference is produced at the sieve disc in a short time. Thereby the melt cake is loaded in an impact-like manner and removed from the sieve disc. The remaining pressure difference is required for the flow and for the withdrawal of the melt cake. The sieve disc to be cleaned is always located outside of the melt passage.

The cleaning of the sieve discs and counterspraying process is known for example from U.S. Pat. No. 3,146,494 In the arrangement disclosed in this reference the sieve disc is always located in the melt passage.

The sieve disc which is permanently located in the melt passage in this construction is provided with a web-like region which has no perforations or openings. A slot-shaped cleaning sleeve is arranged before the sieve disc as considered in the flow direction of the melt. Normally, it is located in the non-perforated region of the sieve disc. In the event of a registrated dirtying of the sieve disc, the cleaning sleeve must be turned so that a cleaning of the efficient sieve disc region is performed in a counterspraying process. The cleaning action of such a construction is relatively low, since the pressure difference at both sides of the sieve disc to be cleaned after introduction of the cleaning sleeve in the perforated region of the sieve disc builds very fast, so that the action of the counterspraying process is relatively short. The available differential pressure is used exclusively for flowing the melt cake. The melt cake is a flow resistance. Depending upon the value of the remaining flow pressure, the flow resistance or in other words, the dirtying or the melt cake is eliminated or not. Since a complete and full cleaning is not possible by the counterspraying of the sieve disc with synthetic plastic melt, a complete exchange and complete cleaning of the sieve discs is required in certain time intervals of the sieve or the sieve disc is increased. The time intervals within which the sieve or sieve disc must be exchanged are significantly increased.

The novel features which are considered as characteristic for the invention are set forth in particular in the appended claims. The invention itself, however, both as to its construction and its method of operation, together with additional objects and advantages thereof, will h=best understood from the following description of specific embodiments when read in connection with the accompanying drawings.

DESCRIPTION OF THE PREFERRED EMBODIMENTS

Figure 1:
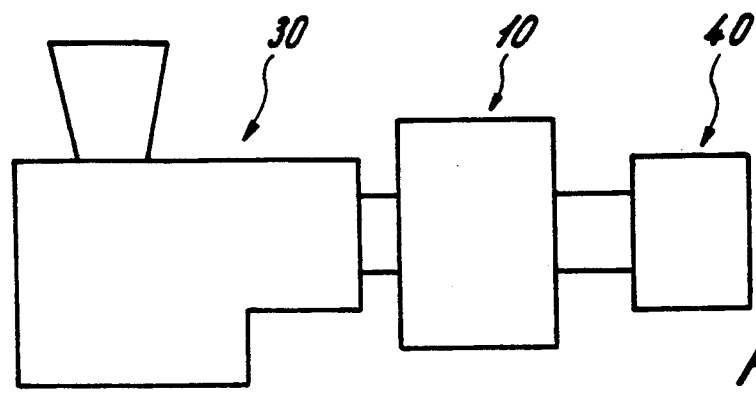
FIG. 1 is a view schematically showing a high pressure press with a sieve arrangement in accordance with the present invention and a tool.

In FIG. 1 a high pressure press is identified with reference numeral 30. The press plasticize the synthetic material granulate and apply its synthetic melt to a tool 40. A sieve arrangement for cleaning the synthetic material melt is arranged in a common melting passage and identified with reference numeral 10.

As can be seen from FIG. 1, the sieve arrangement 10 includes a housing 11 with a throughflow opening 12 which forms a part of a flow passage of the high pressure press 30 and opens into the tool 40. A disc 13 with a plurality of perforations 14 rotates in the housing 11. At least one of the perforations 14 is always in the region of the throughflow opening 12, and at least one of the perforations is always located outside the housing 11. Sieve discs 15 are arranged in the region of the perforations 14 in a known manner. The arrow A in FIG. 2 shows the throughflow direction of the synthetic material melt to be cleaned.

Figure 2:
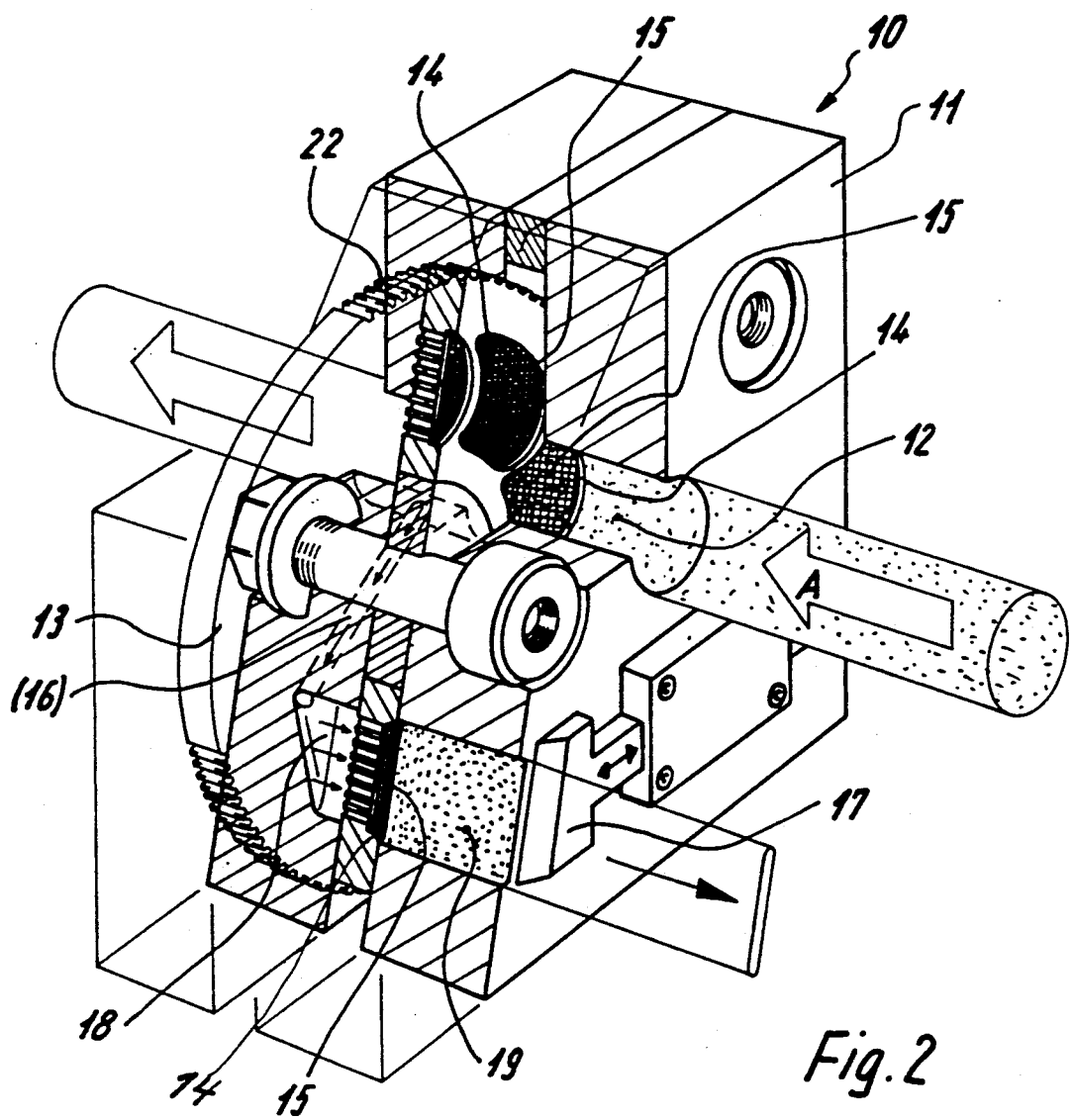
FIG. 2 is a perspective view of the inventive sieve arrangement for cleaning synthetic plastic melt, partially in section.

As can be seen further from FIG. 2, the sieve arrangement 10 is designed so that several perforations 14 are always arranged outside of the throughflow opening 12, but are located completely inside the housing 11. A spray passage 16 is provided at the side of the throughflow opening 12 which lies behind the disc 13 as considered in the flow direction of the synthetic material melt. A slot-shaped spraying passage 16 opens into the spraying nozzle 18. The spraying nozzle 18 is located in the throughflow region of the perforations 14 which always lies outside the throughflow opening 12 and inside the housing 11. The longitudinal extension of the spraying nozzle 18 corresponds to the size of the sieve disc 15.

An outlet passage 19 is provided at the side of the disc 13 which is opposite to the spraying nozzle 18 and inside the housing 11. Preferably, it is arranged in alignment with the spraying nozzle 18. The outlet passage 19 is formed slot-shaped in correspondence with the spraying nozzle 18. The outlet opening of the outlet passage 19 is closeable by a blocking device in form of a blocking slider 17.

The blocking slider 17 of the blocking device is movable in front of the outlet opening of the outlet passage 19. Therefore, it can close the outlet opening. As a result, the spraying passage 16 and the spraying nozzle 18 are blocked as to the flow of the spraying medium.

The disc 13 is rotatable in a known manner by a 20 drive which is not shown in FIG. 2. For this purpose the disc 13 is provided with a toothing 22 on its outer surface. The drive of the disc 13 is turned on when an undesirable pressure increase occurs in the throughflow opening 12 as a result of increased dirtying of the sieve disc 15 located in it. The disc 13 and thereby also the sieve discs are then displaced farther so that the sufficiently clean sieve surface lies in the throughflow opening 12 to maintain a desired pressure in the throughflow opening 12.

The blocking slider 17 is synchronized with the drive for the disc 13. In other words, every time when the disc 13 is rotated by a predetermined angular distance, the blocking slider 17 is withdrawn to its position shown in FIG. 2 in order to release the spraying passage 16, the spraying nozzle 18 and the outlet passage 19. This can be achieved with respect to the switching-on time of the drive for the disc 13 simultaneously or with a time offset. The synchronization of the blocking slider 17 with the drive for the disc 13 involves a quantitative interrelationship between the turning-on of the drive for the disc 13 and the actuation of the blocking slider 17.

When the spraying passage 16, the spraying nozzle 18 and the outlet passage 19 are released, the melt flows through the spraying passage 16 as well as the spraying nozzle 18 and acts on the respective oppositely located sieve disc 15 in an opposite direction than in the case when the sieve disc 15 is located in the throughflow opening 12. Thereby dirt particles deposited on the sieve disc 15 on its side facing toward the outlet passage 19 are sprayed and together with the exiting synthetic material melt discharged from the outlet passage 19.

Figure 3:
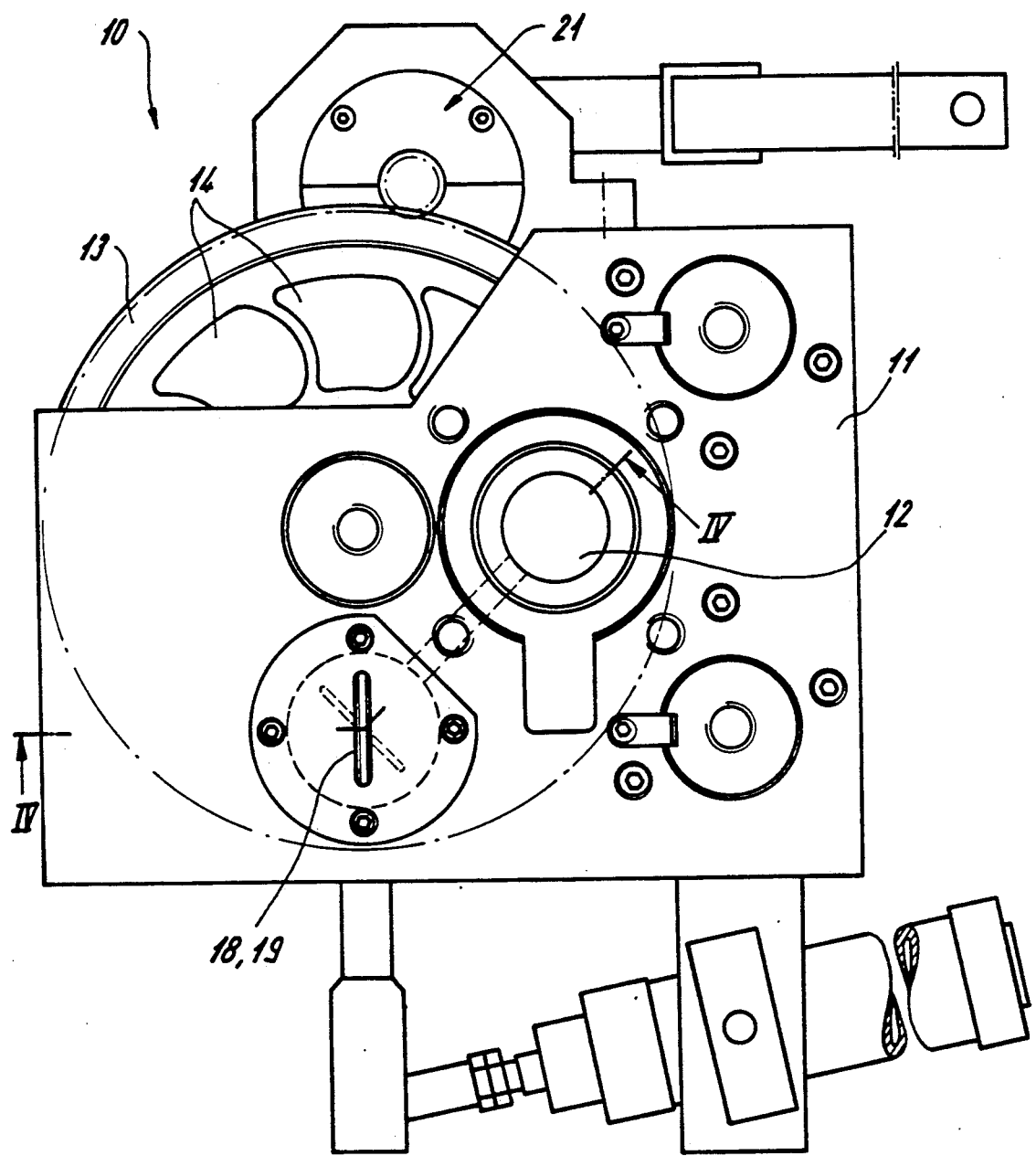
FIG. 3 is a view of a sieve arrangement for cleaning synthetic plastic melt in accordance with a further embodiment of the present invention.
Figure 4:
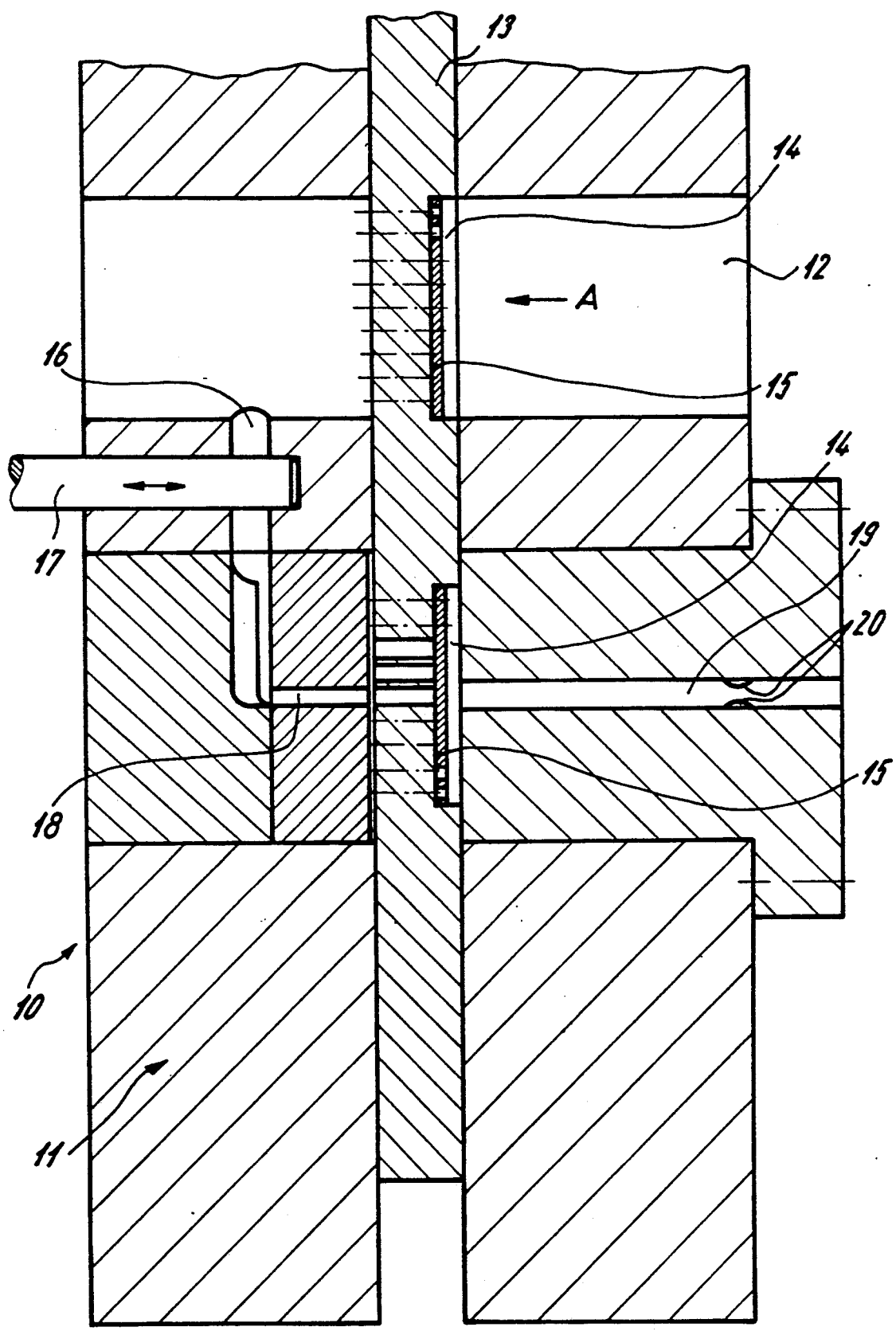
FIG. 4 is a view showing a section taken along the line IV—IV in FIG. 3.

FIGS. 3 and 4 show a further embodiment of the present invention. In this embodiment the parts corresponding to the parts of the embodiment of FIG. 2 are identified with the same reference numerals.

The sieve arrangement 10 shown in FIGS. 3 and 4 has a housing 11 with a throughflow opening 12 forming a part of the flow passage of the high pressure press. A disc 13 with several perforations rotates in the housing, so that at least one of the perforations 14 is always in the region of a throughflow opening 12 and at least one of the perforations is always outside the housing 11. The sieve disc 15 is arranged in the region of the perforations 14 in a known manner. The arrow A in FIG. 4 shows the throughflow direction of the synthetic material melt to be cleaned.

As can be seen from FIGS. 3 and 4, the sieve device 10 is designed so that several perforations 14 are always located outside the throughflow opening 12 and completely inside the housing 1. A spraying passage 16 is provided at the side of the throughflow opening 12 which slides behind the disc 13 as considered in the flow direction of the synthetic material melt. The spraying passage 16 is closeable for example by a blocking device in form of a blocking pin 17. The blocking pin 17 lies directly in the region of the spraying passage 16.

The spraying passage 16 opens in a spraying nozzle 18. The spraying nozzle 18 is arranged in the throughflow region of the perforation 14 which lies always outside of the throughflow opening 12 and inside the housing 11. The longitudinal extension of the spraying nozzle 18 is slot-shaped and corresponds to the size of a sieve disc 15. The outlet passage 19 is provided in the housing 11 at the side of the disc 13 which is opposite to the spraying nozzle 18. The outlet passage 19 preferably is in alignment with the spraying nozzle 18. The outlet passage 19 is formed slot-shaped in correspondence with the spraying nozzle 18.

An adjustable throttle 20 is arranged inside the outlet passage 19. Its operation will be explained herein below. As can be seen from FIG. 3, the disc 13 is rotatable by a drive 21. The drive 21 is the same as the drive which is used for rotation of the disc 13 in the embodiment of FIG. 2.

The drive 21 is turned on and thereby rotates the disc 13 when an undesired pressure increase occurs in the throughflow opening 12 due to the increasing dirtying of the sieve disc 15 located in it. The disc 13 and thereby also the sieve disc 15 are then moved so that the sufficiently clean sieve surface lies in the throughflow opening 12 to maintain a desired pressure in the throughflow opening 12.

The blocking device in form of the above mentioned blocking pin 17 is synchronized with the drive 21 in a manner which will be described hereinbelow.

When the spraying passage 16 is released, the melt flows through the spraying passage 16 and the spraying nozzle 18 and acts on the sieve disc 15 located opposite to it in an opposite direction than in the case when the sieve disc 15 is located in the throughflow opening 12. Thereby dirt particles deposited on the sieve disc 15 at its side facing toward the outlet passage 19 are pressed, sprayed and withdrawn together with the exiting synthetic material melt from the outlet passage 19.

The above described adjustable throttle 20 is utilized for adjusting the pressure conditions in the outlet passage 19 in an optimal ratio to the pressure conditions at the opposite side or in other words in the region of the spraying nozzle 18. At the side of the outlet passage 19 a definite counterpressure to the conditions at the side of the spraying nozzle 18 must be provided.

The above mentioned synchronization of the blocking device with the drive 21 for the disc 13 can be implemented in various ways which are conventional for a person skilled in this field, such as for example by mechanical, pneumatic or electrical control and coupling elements.

Figure 5:
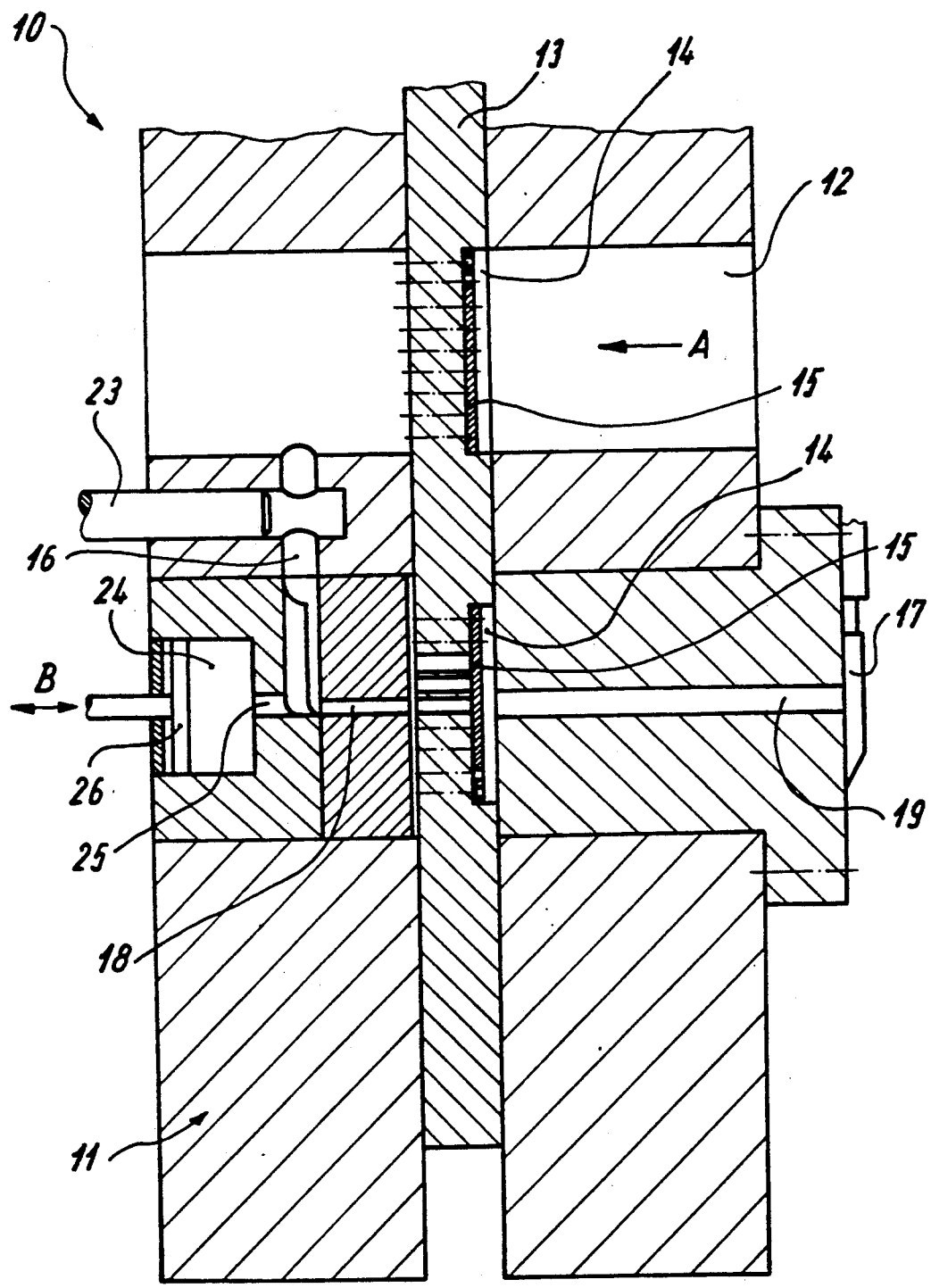
FIG. 5 is a partial view corresponding to the view of FIG. 4, but showing a sieve arrangement in accordance with a further embodiment of the present invention.

FIG. 5 shows a further embodiment of the present invention, in which in correspondence with the embodiment of FIG. 2 a blocking slider is located in the region of the outlet opening of the outlet passage 19. Moreover, a blocking pine 23 is provided in the region of the spraying passage 16. The blocking slider 17 is synchronized with the drive 21 for the disc 13, similarly to the embodiments of FIGS. 2-4.

As can be seen from FIG. 5, a cylinder chamber 24 is arranged in the transitional region from the spraying passage 16 to the spraying nozzle 18. The cylindrical chamber 24 is in communication with the spraying passage 16 and the spraying nozzle 18 through an opening 25. A piston 24 is supported in the cylindrical chamber 24 reciprocatingly in direction of the double arrow B.

The operation of the sieve arrangement 10 in accordance with the embodiment of FIG. 5 is as follows:

The outlet passage 19 is closed in a known manner by the blocking slider 17. The additional blocking pin 23 is preferably withdrawn from the spraying passage 16 as shown in FIG. 5. The piston 36 is located in its shown position in which is it withdrawn relative to the spraying passage 16 and the spraying nozzle 18. In this initial position the liquid synthetic material melt is accommodated inside the spraying passage 16, the cylindrical chamber 24, the opening 25, the spraying nozzle 18 and the outlet passage 19. It is under the same pressure as inside the melt passage 12.

When the drive 21 which is not shown in FIG. 5 is activated for moving or rotating the disc 13, the additional blocking pin 23 is moved into the spraying passage 16 so that it is blocked relative to the melting passage 12. Immediately thereafter the piston 26 is moved in direction of the spraying nozzle 18, or in other words, the pressure of the synthetic material melt located in the spraying passage 16, the cylindrical chamber 24, the opening 25, the spraying nozzle 18 and the outlet passage 19 is considerably increased depending on the loading of the piston 26. When the blocking slider 17 is opened in a pulse-like manner, a higher pressure drop is available than the pure use of the melt pressure in the melt passage 12, for the cleaning purpose of the sieve disc 15. The cleaning effect can be significantly increased due to the additional pressure increase by the piston 26.

The general advantage of the cleaning device of the above described sieve arrangement 10 is that each sieve disc 15 is successively cleaned when one sieve disc 15 passes through the throughflow opening 12. This means that a release of the spraying passage 16 is obtained always for a short time and without significant change of the pressure condition in the region of the throughflow opening 12.

The slot width of the spraying nozzle 18 is relatively small with respect to the size of the sieve disc 15 to be cleaned. The slot width can lie between 0.5 and 15 mm. The slot width of the spraying nozzle 18 can be advantageously selected so that it substantially corresponds to the size of displacement cycle of the sieve discs.

It will be understood that each of the elements described above, or two or more together, may also find a useful application in other types of constructions differing from the types described above.

While the invention has been illustrated and described as embodied in a sieve arrangement for cleaning synthetic material melts in a high pressure press, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A sieve arrangement for cleaning synthetic plastic melts of a high pressure press, comprising a housing having a throughflow opening which is arranged to form a part of a flow passage of a high pressure press; a disc provided with a plurality of perforations and a sieve in each of said perforations and movable in said housing so that at least one of said perforations with said sieve is always in the region of said throughflow opening and at least one of said perforations with said sieve disc is always outside said housing; a blockable spraying passage provided at the side of the throughflow opening which is located behind said disc as considered in a flow direction; a slot-shaped spraying nozzle associated with said perforation located always outside said throughflow opening and inside said housing so that said spraying passage opens into said spraying nozzle so as to provide an opposite flow through said sieve in said one perforation located outside said housing; an outlet passage provided in said housing at a side of said disc which is opposite to said spraying nozzle, one of said spraying passage and said outlet passage being provided with a blocking device which is synchronized with a drive of said disc, said spraying nozzle having a slot width which substantially corresponds to a value of a displacement cycle of said sieve discs.

2. A sieve arrangement as defined in claim 1, wherein said disc is displaceable in a cyclic manner.

3. A sieve arrangement as defined in claim 1, wherein said disc is rotatable in a cyclic manner.

4. A sieve arrangement as defined in claim 1, wherein said blocking device includes an adjustable throttle located in the region of said outlet passage.

5. A sieve arrangement as defined in claim 1, wherein said blocking device includes a blocking pin reciprocatable transversely to said spraying passage.

6. A sieve arrangement as defined in claim 4, wherein said blocking device also includes a blocking pin reciprocatable transversely to said spraying passage.

7. A sieve arrangement as defined in claim 1, wherein said outlet passage is formed slot-shaped in correspondence with said spraying nozzle.

8. A sieve arrangement as defined in claim 1, wherein said spraying nozzle has a slot width corresponding to substantially 0.5–15 mm.

9. A sieve arrangement as defined in claim 1, wherein said outlet passage has an outlet opening, said blocking device including a blocking slider which is reciprocable transversely to said outlet passage and is located in front of said outlet opening of said outlet passage.

10. A sieve arrangement as defined in claim 9, wherein said blocking device further includes a blocking pin arranged in said spraying passage provided in a cylindrical chamber which is located in the region of said spraying passage and said spraying nozzle and communicates through an opening with said spraying passage and said spraying nozzle; and further comprising a piston reciprocable in said cylindrical chamber so that a pressure of a synthetic material melt located in said spraying passage, said cylindrical chamber, said opening, said spraying nozzle and said outlet passage can be increased after closing said spraying passage by said blocking pin and before opening of said outlet passage by displacing said blocking slider by said piston.

* * * * *